US005438496A

United States Patent [19]

Meur et al.

[11] Patent Number: 5,438,496

[45] Date of Patent: Aug. 1, 1995

[54] CONNECTION DEVICE WITH NO ELECTRICAL CONTACT

[75] Inventors: Jean-Pierre Meur, La Ville Du Bois; Bernard Vermesse, L'Hay les Roses, both of France

[73] Assignee: Societe Anonyme Dite: Neopost Industrie, Bagneux, France

[21] Appl. No.: 34,395

[22] Filed: Mar. 18, 1993

[30] Foreign Application Priority Data

Mar. 23, 1992 [FR] France ................................ 92 03458

[51] Int. Cl.⁶ ...................... H02M 3/335; G06F 15/20

[52] U.S. Cl. .................................. 363/16; 364/464.02

[58] Field of Search ..................... 363/15, 16; 323/355, 323/358; 307/17; 364/464.01, 464.02, 464.03

[56] References Cited

U.S. PATENT DOCUMENTS

| | | | |
|---|---|---|---|
| 4,471,440 | 9/1984 | Check, Jr. | 364/466 |
| 4,916,626 | 4/1990 | Vermesse | 364/464.02 |
| 4,945,255 | 7/1990 | Suzuki et al. | 307/17 |
| 5,267,132 | 11/1993 | Gulczynski | 363/16 |
| 5,267,172 | 11/1993 | Vermesse | 364/464.02 |
| 5,272,381 | 12/1993 | Millard | 307/17 |
| 5,309,343 | 5/1994 | Schlenk | 363/16 |

FOREIGN PATENT DOCUMENTS

| | | | |
|---|---|---|---|
| 1164128 | 10/1958 | France | H01F 28/00 |
| 2274147 | 1/1976 | France | H01R 15/26 |
| 1276684 | 9/1968 | Germany | H01F 28/00 |
| 3503348 | 6/1986 | Germany | H01F 3/08 |
| 3802661 | 8/1989 | Germany | H01F 9/00 |

OTHER PUBLICATIONS

Patent Abstracts of Japan, vol. 11, No. 51 (E-480) Feb. 17, 1987 & JP-A-61 214 407 (MITA) Sep. 24, 1986.

*Primary Examiner*—Steven L. Stephan
*Assistant Examiner*—Matthew V. Nguyen
*Attorney, Agent, or Firm*—Sughrue, Mion, Zinn, Macpeak & Seas

[57] ABSTRACT

A connection device without electrical contact for connecting a fixed part of a franking machine to a rotary print drum containing electronic circuits includes a transformer separable into two parts respectively fastened to the fixed part and to the rotary printing drum. A first modulator chops and modulates a DC current supplied to a first winding in sympathy with a first signal to be transmitted to the rotary drum. A rectifier and filter device supplies power to the electronic circuits in the rotary drum. A first demodulator demodulates the current induced in the second winding. A second modulator modulates the current induced in the second winding at a different frequency to that used by the first modulator and in sympathy with a second signal to be transmitted to the fixed part. A second demodulator extracts the second signal from the current in the first winding.

25 Claims, 8 Drawing Sheets

CONNECTION DEVICE WITH NO ELECTRICAL CONTACT

BACKGROUND OF THE INVENTION

1. Field of the Invention

The invention concerns a connection device with no electrical contact for making and breaking at will a connection conveying electrical power and/or an electrical signal from a first part of a machine to a second part.

2. Description of the Prior Art

Connection devices conventionally comprise electrical contacts and are subject to faults caused either by pollution, oxidation or wear or by impact during assembly or disassembly of the machine. French patent application no 2 655 753 describes a connection device with electrical contacts comprising two parts which plug into each other and a manually operated device for retracting one of these two parts to prevent impact between the two parts of the connection device during assembly or disassembly of the machine. This known device can thus prevent damage to the connection device during assembly or disassembly of the various parts of a machine but like all connection devices with electrical contacts it is subject to pollution, oxidation and wear of the contact members.

These phenomena are all the more marked in the case of connecting two parts of a machine which rotate relative to each other. In such cases it is known to use a connection device comprising at least one conductive ring and at least one conductive brush rubbing on this ring, the number of rings depending on the number of circuits to be made. A device of this kind wears particularly quickly if the relative movement is frequent or continuous. Also, assembling and disassembling a machine comprising a connection device of this kind is particularly difficult: there is always the risk of damaging the brushes or the rings.

It is known from U.S. Pat. No. 4,296,273 to replace rings and brushes connecting the fixed part of a magnetic tape recorder to a rotary drum carrying the record and playback heads and an electronic circuit with two rotary transformers, one conveying the electrical power to feed the electronic circuit in the drum and the other conveying either a video signal to be recorded on magnetic tape or a video signal read from magnetic tape. This American patent discloses an improvement to this device whereby a single rotary transformer may be used, i.e. a more compact system.

This device exploits one feature of video signals: the major part of each picture line period represents picture elements (pixels) and the minor part is used merely for synchronization and for the return movement (flyback) of the cathode ray tube scanning beam. The device transmits electrical power only during periods in which the video signal does not represent pixels. The device transmits the video signal during the remainder of each line period. The single transformer is thus used alternately to transmit power and to transmit a signal. This device is not subject to the wear characteristic of brush and ring devices and is less bulky than a connection device using two rotary transformers, but it nevertheless has the same two drawbacks: it makes assembly and disassembly of the drum difficult and it is too specifically adapted to the transmission of video signals. It cannot be used if it is necessary to transmit a signal to or from the drum continuously, as transmission of the signal must be interrupted periodically to transmit electrical power.

These two drawbacks arise in connection with establishing a connection between two parts of a mail franking machine. This type of machine usually comprises a fixed part or base incorporating an electrical power supply and a fixed but removable part or head which is fixed to the base during normal operation of the machine. The head may incorporate a rotary print drum which rotates relative to it. A franking machine comprises electronic circuits divided into several parts which must be interconnected firstly to receive electrical power from the power supply in the base and secondly to exchange digital signals at a rate of a few hundred kilobits per second. A connection device is specifically required to make or break at will a connection transmitting electrical power and electrical signals between the base and the head of the machine. The head includes electronic circuits for totalizing franking amounts. It is removable to enable the postal authority to totalize franking operations carried out on the basis of data stored in non-volatile electronic memory. The head must therefore be removed from and refitted to the base at frequent intervals. It is relatively heavy. If the head is connected to the base by a conventional connector the latter may be damaged by impact between its two parts. The device described in French patent application no 2 655 753 solves this problem by enabling retraction of one of the two parts of a conventional connector during the trial and error process of fitting the head to the base. However, it does not solve the problems of pollution, wear and oxidation of the metal contacts.

Consideration has been given to accommodating some of the electronic circuits inside the rotary print drum. A connection device is then required to connect the electronic circuits inside the drum to the electronic circuits in the remainder of the head. Although it is rarely necessary to demount the drum from the head it must be possible to do this without impediment by the connection device. Once again, assembly and disassembly must be simple and easy.

An object of the invention is to propose a connection device providing a secure connection, in particular through avoiding all problems of damage to metal contact members during assembly and disassembly, and which enables a connection to be made or broken at will. Another object of the invention is to propose a device which is able to convey electrical power and a signal simultaneously in one direction and optionally a second signal in the opposite direction.

The connection devices in franking machines may be misused in an attempt to sabotage the electronic circuits which totalize franking operations carried out, by applying high voltages to them. A further object of the invention is therefore to propose a connection device which is particularly resistant to any such sabotage attempts.

SUMMARY OF THE INVENTION

In one aspect the present invention consists in a connection device with no electrical contact for making and breaking at will a connection for transmitting electrical power and an electrical signal from a first part of a machine to a second part, said device comprising at least one transformer separable into two parts, a first part of each transformer being fastened to said first part of said machine and comprising a first magnetic circuit portion passing through a first winding to which the power and the electrical signal to be transmitted are applied, a second part of each transformer comprising a second magnetic circuit portion fastened to said second part of said machine and passing through at least one second electrical winding, said device further comprising:

—means for chopping a current supplied to a first winding of a first transformer by a DC power supply,
—means for modulating one characteristic of the current supplied to said first winding in sympathy with a signal to be transmitted from said first part to said second part of said machine,
—means for rectifying and filtering a voltage induced in a second winding of said first transformer, the rectified and filtered voltage constituting a supply voltage, and
—means for demodulating the voltage induced in said second winding and feeding a signal to said second part of said machine.

This device is able to transmit electrical power and a signal simultaneously because it uses the same current for both functions. The signal may comprise digital data to be transmitted between the head and the base of a franking machine, for example. It may instead be an analog signal such as a video signal. The chopping and modulation characteristics are chosen to suit the type of signal to be transmitted. The device of the invention therefore remedies the drawback of the device known from U.S. Pat. No. 4,926,273 in which power could not be transmitted at the same time as a signal.

A first variant of the device in accordance with the invention, usable to transmit additionally a signal from the second part of the machine to the first part, further comprises:

—means for applying to said second winding a voltage modulated in sympathy with said signal to be transmitted from said second part of said machine to said first part, and
—means for demodulating a voltage induced in said first winding by said second winding and feeding a signal to said first part of said machine.

This first variant not only supplies power to the electronic circuits in the second part of the machine but also exchanges signals between the two parts of the machine. It is particularly well suited to half duplex transmission of the signals because this avoids any possibility of mixing of the two signals without requiring specific precautions against this possibility.

Full duplex transmission is possible providing that modulation and demodulation means are used which operate at clearly different frequencies for each of the two transmission directions, for example.

A second variant of the device in accordance with the invention, for additionally transmitting a signal from the second part of the machine to the first part, comprises:

—a second transformer comprising a third winding and a fourth winding for transmitting said signal from said second part of said machine to said first part independently of said power and said signal transmitted by said first and second windings from said first part of said machine to said second part,
—means for applying to said fourth winding a voltage modulated in sympathy with said signal to be transmitted from said second part of said machine to said first part, and
—means for demodulating a voltage induced in said third winding and feeding a signal to said first part of said machine.

This variant is larger overall than the first variant but has the advantage of simpler implementation in the case of full duplex transmission. There is no risk of mixing of the two signals because the two transmission directions are independent because of the two separate transformers. There is therefore no need to complicate the modulation and demodulation means to separate the signals.

In another aspect, the invention consists in a mail franking machine comprising a printhead removable from a fixed base and, for connecting electronic circuitry of said head to electronic circuitry of said base, a connection device with no electrical contact for making and breaking at will a connection for transmitting electrical power and an electrical signal from a first part of a machine to a second part, said device comprising at least one transformer separable into two parts, a first part of each transformer being fastened to said first part of said machine and comprising a first magnetic circuit portion passing through a first winding to which the power and the electrical signal to be transmitted are applied, a second part of each transformer comprising a second magnetic circuit portion fastened to said second part of said machine and passing through at least one second electrical winding, said device further comprising:

—means for chopping a current supplied to a first winding of a first transformer by a DC power supply,
—means for modulating one characteristic of the current supplied to said first winding in sympathy with a signal to be transmitted from said first part to said second part of said machine,
—means for rectifying and filtering a voltage induced in a second winding of said first transformer, the rectified and filtered voltage constituting a supply voltage, and
—means for demodulating the voltage induced in said second winding and feeding a signal to said second part of said machine.

In a further aspect, the invention consists in a mail franking machine comprising a printhead having a rotary print drum containing rotary electronic circuits and, for connecting said electronic circuits in said drum to fixed electronic circuits in said printhead, a connection device with no electrical contact for making and breaking at will a connection for transmitting electrical power and an electrical signal from a first part of a machine to a second part, said device comprising at least one transformer separable into two parts, a first part of each transformer being fastened to said first part of said machine and comprising a first magnetic circuit portion passing through a first winding to which the power and the electrical signal to be transmitted are applied, a second part of each transformer comprising a second magnetic circuit portion fastened to said second part of said machine and passing through at least one second electrical winding, said device further comprising:

—means for chopping a current supplied to a first winding of a first transformer by a DC power supply,
—means for modulating one characteristic of the current supplied to said first winding in sympathy with a signal to be transmitted from said first part to said second part of said machine, —means for rectifying and filtering a voltage induced in a second winding of said first transformer, the rectified and filtered voltage constituting a supply voltage, and —means for demodulating the voltage induced in said second winding and feeding a signal to said second part of said machine.

Preferred embodiments of the invention are defined in claims 4 through 9, 11 through 17 and 19 through 25.

The invention will be better understood and other features with particular reference to franking machines will emerge from the following description of various embodiments of the invention.

DETAILED DESCRIPTION OF THE INVENTION

Figure 1:
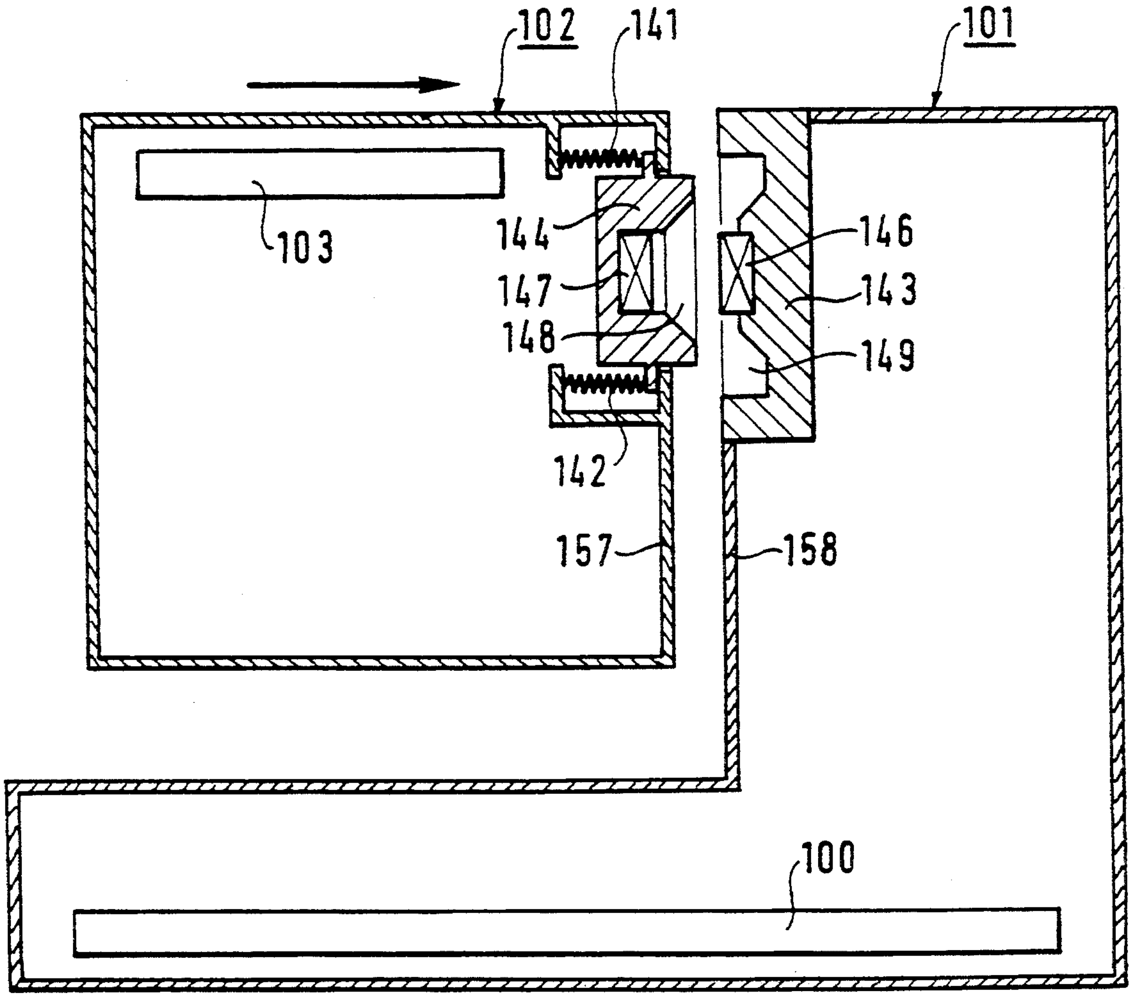
FIG. 1 is a diagrammatic view in cross-section of a franking machine comprising a removable head connected to a fixed base by a first embodiment of a device in accordance with the invention.

FIG. 1 shows diagrammatically and by way of example a franking machine comprising a removable part or printhead 102 connected to a fixed part or base 101 by a first embodiment of a device in accordance with the invention. This device comprises electronic means which are not shown in FIG. 1 but which are described later with reference to FIG. 7. FIG. 1 shows the head 102 approaching the base 101 in the direction shown by an arrow, just before the connection is made. The head 102 comprises locating and mechanical locking means that are not shown in this figure. They may comprise the known means disclosed in French patent application no 2 655 753: four fingers projecting from the wall 157 of the head 102 entering four holes in the wall 158 of the base 101. Each of the four fingers has a circular groove approximately half-way along it. A locking device fixed to the base 101 is operated manually to displace four forks which are inserted into respective grooves of the four fingers to prevent them escaping from the four holes.

In this embodiment of a connection device in accordance with the invention the head 102 comprises electronic circuits 103 which are connected to electronic circuits 100 in the base 101 to supply electrical power to the circuits 103 and to exchange data signals in both directions.

On the removable head 102 the connection device essentially comprises:

—a guide member 144 incorporating a cavity 148 at the back of which is a first half 147 of a separable transformer, and —two springs 141 and 142 fastened to the member 144 and to walls of the head 102.

On the base 101 the connection device essentially comprises:

—a second half 146 of the separable transformer, and

—a guide member 143 fastened to the wall of the base 101 and comprising a cavity 149 having at its center a projecting part 145 into the end of which is recessed the second half 146 of the separable transformer.

Figure 2:
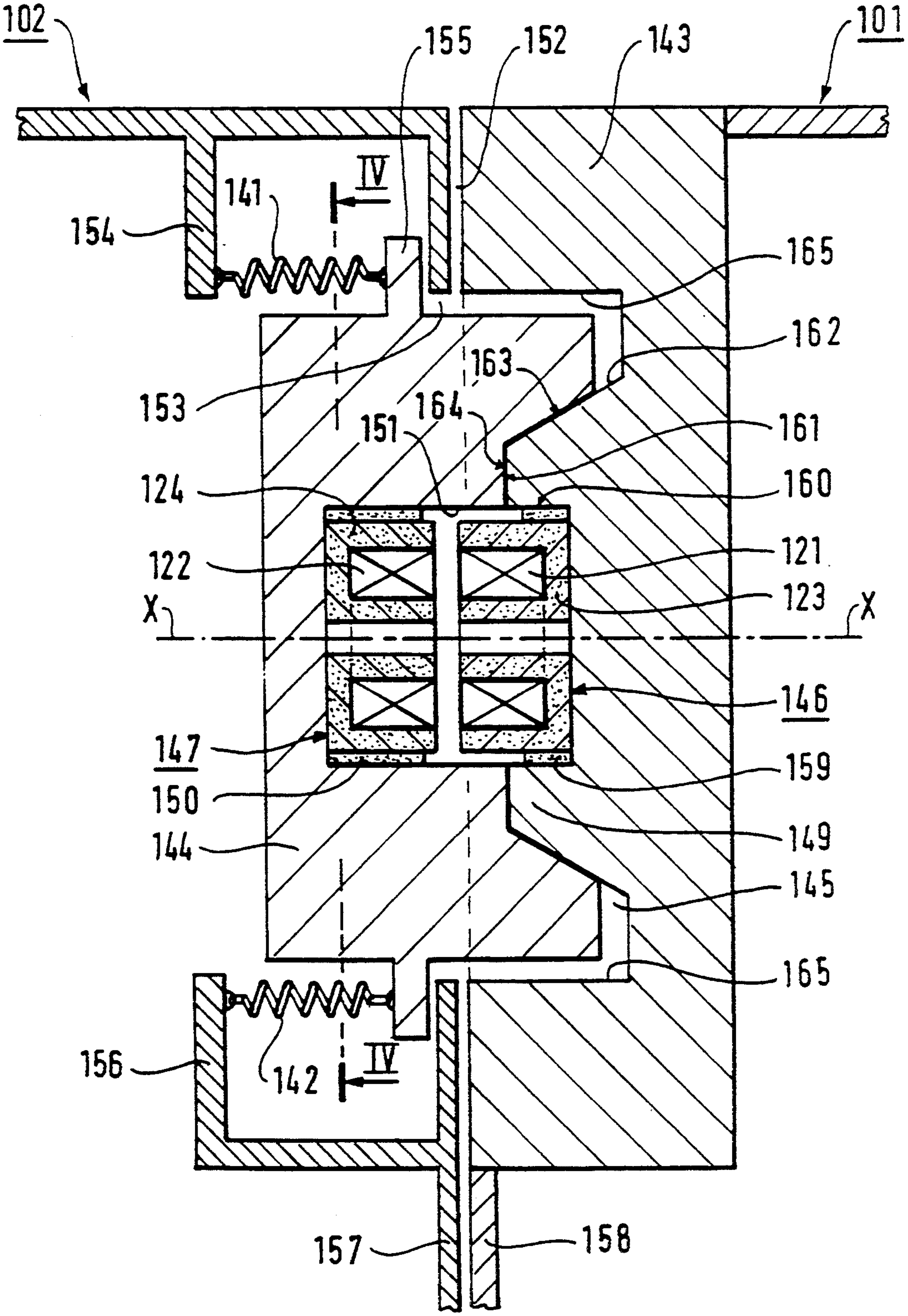
FIG. 2 is a diagrammatic view in cross-section of this first embodiment in more detail.

FIG. 2 shows this first embodiment of a connection device in accordance with the invention in more detail. It shows the guide members 143 and 144 in the position they assume when the connection is made. The two halves 146 and 147 of the transformer and the guide members 143 and 144 have a common axis of symmetry of revolution XX when the connection is made.

The member 144 has a circular cylindrical outermost surface which slides in a circular window 153 in the wall 157 of the head 102. Part of the member 144 projects from the wall 157. The springs 141 and 142 push on a circular ring 155 around the member 144 and bear against arms 154 and 156 fastened to the wall 157 of the head 102 to urge the member 144 outwardly of the head 102. When the connection is not made the ring 155 acts as an abutment to prevent the member 144 escaping completely from the head 102.

The function of the springs 141 and 142 when the connection is made is to press the guide member 144 against the guide member 143 to take up any clearance which may exist between the wall 157 of the head 102 and the surface 152 of the member 153 which extends the wall 158 of the base 101. The diameter of the window 153 is sufficiently large to provide some clearance around the guide member 144 and to enable any error in positioning the head 102 relative to the base 101 in a plane parallel to their contacting surface to be compensated. In this way the guide member 144 has some degree of freedom of movement in the direction of the axis XX and also in a plane perpendicular to this axis.

The cavity in the guide member 144 has a frustoconical surface 163 truncated by a plane surface orthogonal to the axis XX. This annular plane surface constitutes an abutment surface 164. A cylindrical hole 151 is formed at the center of this ring. The transformer half 147 is bonded to the back of this hole 151 using epoxy adhesive 150. The half 147 does not project from the hole 151. In this way it is protected against impact. The guide member 144 has a complementary concave funnel shape to receive the projecting part 145 of the guide member 143. The cavity 149 in the guide member 143 has at its periphery a circular cylindrical surface 165 whose diameter is equal to that of the window 153, for example, to provide some clearance for the guide member 144 as it enters the cavity 149. The projecting part 145 at the center of the cavity 149 in the guide member 143 has a frustoconical surface 162 truncated by a plane surface orthogonal to the axis XX. This annular plane surface constitutes an abutment surface 161.

A cylindrical hole 160 is formed at the center of this ring. The transformer half 146 is bonded to the back of the hole 160 using epoxy adhesive 159. The half 146 projects out of the hole 160 and into the hole 161. Its visible side is near the visible side of the other transformer half 147 but there is a gap between these two sides. Note also that the plane of the visible side of the part 146 is aligned with the surface 152 of the part 143 and the wall 158. In other words, the part 146 does not project out of the base 101. This is to avoid any risk of damage to this part 146.

When the connection is made the abutment surface 164 of the guide member 144 bears on the abutment surface 161 of the guide member 143 and the concave frustoconical surface 163 of the guide member 144 bears on the convex frustoconical surface 162 of the guide member 143. The function of the frustoconical surfaces 162 and 163 is to center the two transformer halves 146 and 147 facing each other.

They also define the distance between the two halves 146 and 147 but the inclination of the surfaces 162 and 163 relative to the axis XX introduces some inaccuracy into this distance. The function of the abutment surfaces 161 and 164 is to define more accurately the distance between the two transformer halves.

The transformer half 147 is butted against the back of the hole 151 in the guide member 144 and is then bonded to the wall of this hole. The transformer half 146 is butted against the back of the hole 160 in the guide member 143 and is then bonded to the wall of this hole. This bonding operation is described in more detail later. The thickness of each transformer half 146 and 147 is known precisely and consequently the width of the airgap between the two halves is extremely precisely defined when the guide members 144 and 143 bear against each other. The width of the airgap has a non-null value so that there is never any contact between the transformer halves. This avoids any risk of damage during assembly of the head 102 to and its disassembly from the base 101. However, the width of the airgap is made sufficiently small to enable transmission of power and data signals with reasonable efficiency.

Figure 3:
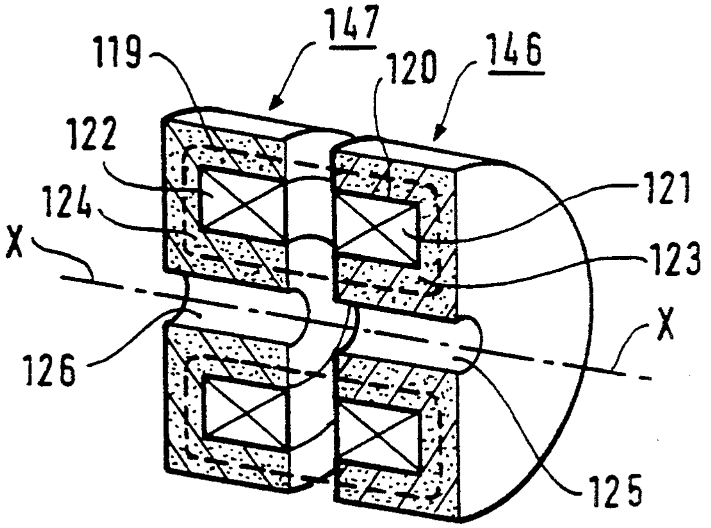
FIG. 3 is a perspective view in cross-section of the transformer used in the first embodiment.

FIG. 3 shows the transformer 146, 147 in perspective and in cross-section. The two transformer halves 146, 147 are of similar design. Each comprises a conventional ferrite half-pot 123, 124. Each half-pot 123, 124 is the shape of a flat cylinder with a circular groove 119, 120 in one plane surface and each contains a single winding 121, 122. The ends of the windings 121, 122 are connected to the exterior through holes (not shown) in the half-pots 123, 124. The half-pots 123 and 124 conventionally comprise a cylindrical hole 125, 126 along the axis of symmetry of revolution XX. In this instance the holes 125 and 126 are not used to fix the two transformer halve.

The magnetic field lines are shown in dashed line.

Figure 4:
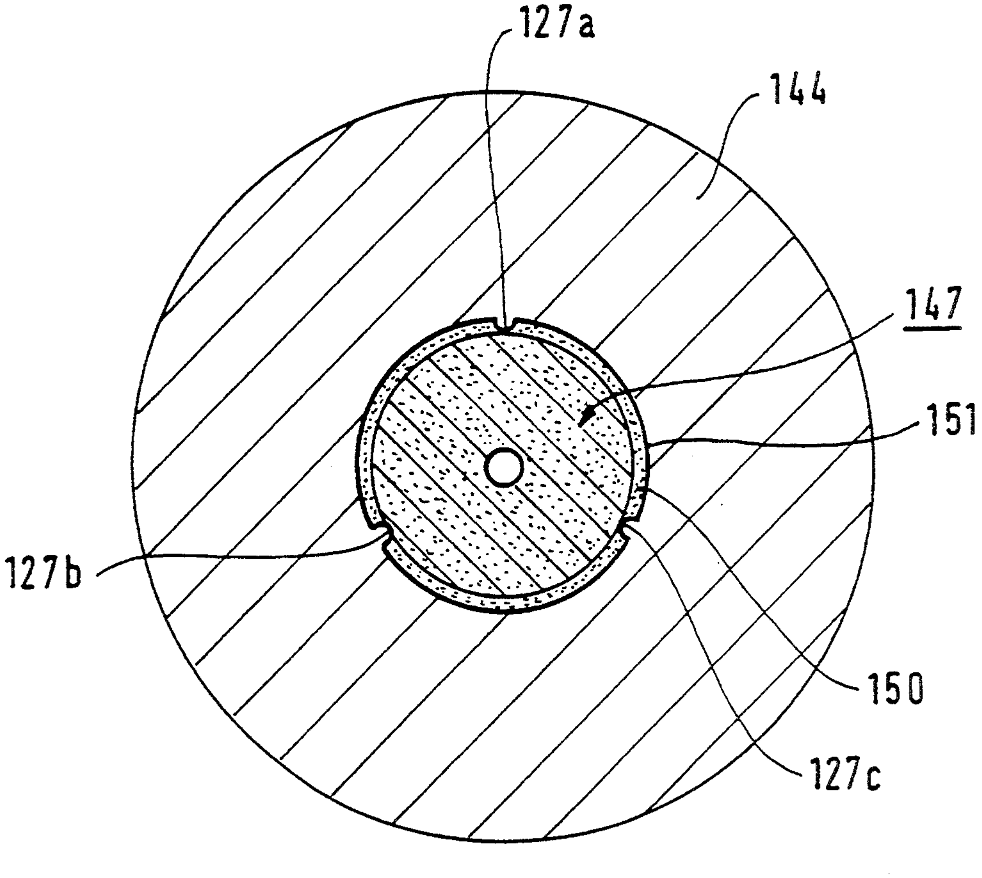
FIG. 4 is a view of the first embodiment in cross-section showing how one half of the transformer is fixed.

FIG. 4 is a diagrammatic view of the first embodiment in cross-section on the line IV IV. It shows that the transformer half 147 is inserted in a hole 151 whose diameter is slightly greater than its own diameter and which incorporates three ribs 127*a*, 127*b*, 127*c* for wedging the transformer half 147. The epoxy adhesive 150 is then poured into the gap between the transformer half 147 and the wall of the hole 151. The transformer half 146 is fixed by an analogous process into the hole 160 in the guide member 143. There is no adhesive between the back of the hole and the back of each transformer half and consequently the position of each transformer half relative to the guide members 143 and 144 is not dependent on the quantity of adhesive used to fix the two transformer halves 146 and 147. The man skilled in the art will of course know how to use other fixing processes, in particular using the holes 125 and 126 that exist in conventional ferrite half-pots available through normal commercial channels.

The guide members 143 and 144 are made from metal by a conventional manufacturing process, for example, or from a plastics material.

Figure 5:
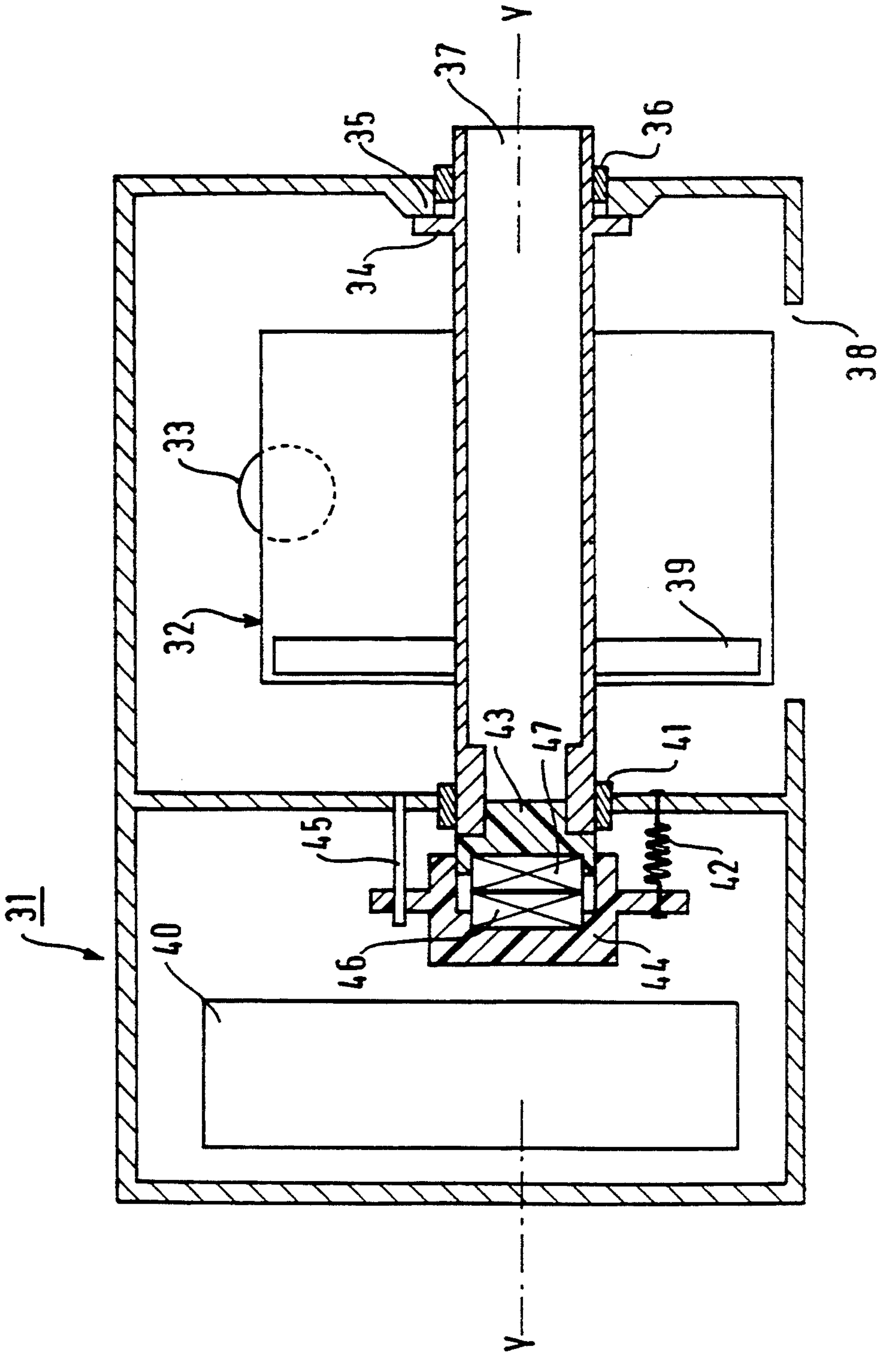
FIG. 5 is a diagrammatic view in cross-section of a different franking machine comprising a rotary drum connected to the components of a printhead by a second embodiment of a device in accordance with the invention.

FIG. 5 is a diagrammatic view in cross-section of the head 31 of a different franking machine comprising a second embodiment of a connection device in accordance with the invention. The connection device comprises electronic means which are not shown but which are described later with reference to FIG. 7. FIG. 5 shows the machine when the connection has been made. The head 31 comprises a rotary print drum 32 having a plurality of print wheels 33 and an electronic circuit 39 which rotates with the drum 32 which has a hollow shaft 37 supported by bearings 41 and 36. The rotary drum 32 is rotated about the axis YY by means (not shown) comprising a shaft fitted with a key and which is nested within the hollow shaft 37, on the righthand side of the figure, when the head 32 is mounted on a base (not shown).

The connection device 42 through 47 is at the other end of the shaft 37 (at the lefthand side of the figure). It connects the electronic circuits 39 which rotate with the drum 32 to electronic circuits 40 which are attached to the remainder of the head 31 and which are therefore fixed in position. It makes this connection without electrical contact. In this embodiment the connection device comprises a separable transformer in two halves 46 and 47 which are held face-to-face with an airgap of predetermined width between them by two guide members 43 and 44, a finger 45 and a spring 42.

The shaft 37 is free to rotate about the axis YY and free to move in translation along the axis YY in one direction only, the direction towards the left in the figure. It is prevented from moving in translation in the opposite direction (towards the right in the figure) by a ring 34 in one piece with the shaft 37 and bearing on a ring 35 in one piece with the wall of the head 31.

The transformer used in this embodiment is similar to that previously described. It has an axis of symmetry of revolution coincident with the axis YY. The two transformer halves 46 and 47 are identical and are disposed face-to-face so that the transformer can be separated at a plane constituting a plane of symmetry of the transformer perpendicular to the axis YY.

Figure 6:
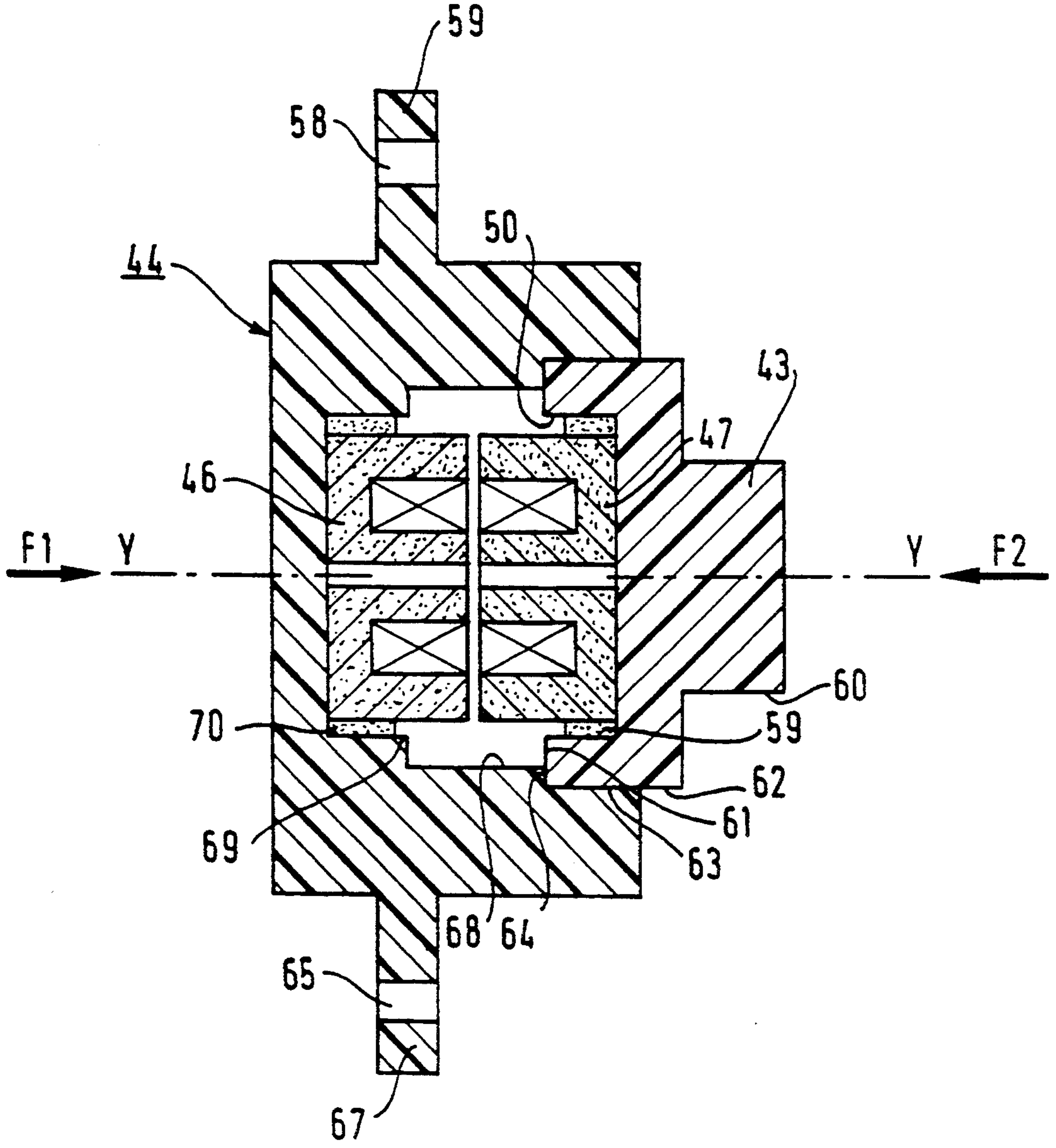
FIG. 6 is a diagrammatic view in cross-section of the second embodiment in more detail.

FIG. 6 is a diagrammatic view of the second embodiment of a connection device in accordance with the invention in cross-section showing certain details of the device. The member 44 has a lug 59 in which is a cylindrical hole 58 in which slides the cylindrical finger 45 shown in FIG. 5. The member 44 comprises another lug 67 symmetrical to the first and having a hole 65 for attaching a first end of the spring 42. The other end of the spring 42 is fixed to a fixed part of the head 31. All the component parts of this second embodiment have an axis of symmetry of revolution YY coincident with the rotation axis of the drum 32 with the exception of the two lugs 59, 67 on the member 44 which are nevertheless symmetrical relative to the axis YY and with the exception of the finger 45 and the spring 42.

The transformer half 47 is supported by the guide member 43 which has a first cylindrical outer surface 60 which fits inside the hollow shaft 37. The member 43 is fastened to the shaft 37 by means of grooves (not shown). The member 43 has a second cylindrical outer surface 62 which fits in a cylindrical hole 63 of the guide member 44 which supports the transformer half 46. When the member 44 is nested with the member 43 the two transformer halves 46, 47 are disposed face-to-face and precisely centered.

The members 44 and 43 have clearance to enable freedom of movement in rotation and translation. The freedom of movement in translation enables assembly of the member 44 to the member 43 and its disassembly therefrom. After assembly this freedom of movement in translation enables the spring 42 to press the member 44 against the member 43. The spring 42 in this way compensates any error in the transverse positioning of the shaft 37 and the member 43. The freedom of movement in rotation enables the member 43 to rotate with the shaft 32 whereas the member 44 is immobilized by the finger 45.

The member 43 has a circular annular plane surface perpendicular to the axis YY which constitutes an abutment surface 61. A cylindrical hole 50 at the center of this ring contains the transformer half 47 which is attached using epoxy adhesive 59 in a manner similar to that previously described. The transformer half 47 projects out of the member 43 into a cavity in the member 44. This cavity has three cylindrical inside surfaces 63, 68, 69 having the same axis of symmetry of revolution YY and respective diameters which decrease from the entry towards the back of the cavity. The surface 63 mates with the surface 62 of the guide member 43 as previously mentioned. Between the surfaces 63 and 68 a plane surface orthogonal to the axis YY constitutes a circular annular abutment surface 64. The diameter of the surface 68 is greater than the diameter of the transformer halves 46, 47 to enable insertion of the half 47 into the cavity without risk of the half 47 impacting on this surface 68. The diameter of the cylindrical surface 69 is slightly greater than that of the transformer and this surface incorporates three ribs similar to the ribs 127*a*, 127*b*, 127*c* described previously. These ribs (not shown) are used to locate the transformer half 47. The latter is bonded to the surface 69 using epoxy adhesive 70.

Because the shaft 37 is prevented from movement in translation by the rings 34 and 35 and because traction is applied to the member 44 by the spring 42, two opposite forces F1 and F2 are respectively applied to the guide members 44 and 43. They are moved towards each other by these forces until the abutment surface 64 bears on the abutment surface 61. The member 43 therefore bears at all times on the member 44, by virtue of the action of the spring 42. The width of the airgap between the transformer parts 46 and 47 is thus maintained equal to the value chosen when the device was designed.

The members 44 and 43 may be made from polyamide, for example, to reduce friction forces and wear at the abutment surfaces 61 and 64.

The connection device is easy to disassemble for maintenance purposes. All that is required is to unhook the spring 42 from the hole 65 and to pull on the member 44. Re-assembly is possible without risk of damage to the transformer halves 46, 47 because they are guided towards each other by the surfaces 63 and 62 of the guide members 43 and 44 as soon as the member 44 is inserted into the member 43. Also, the member 44 is light in weight and therefore easy to manipulate.

It is of course feasible to use the first and second embodiments described hereinabove in one and the same franking machine.

Figure 7:
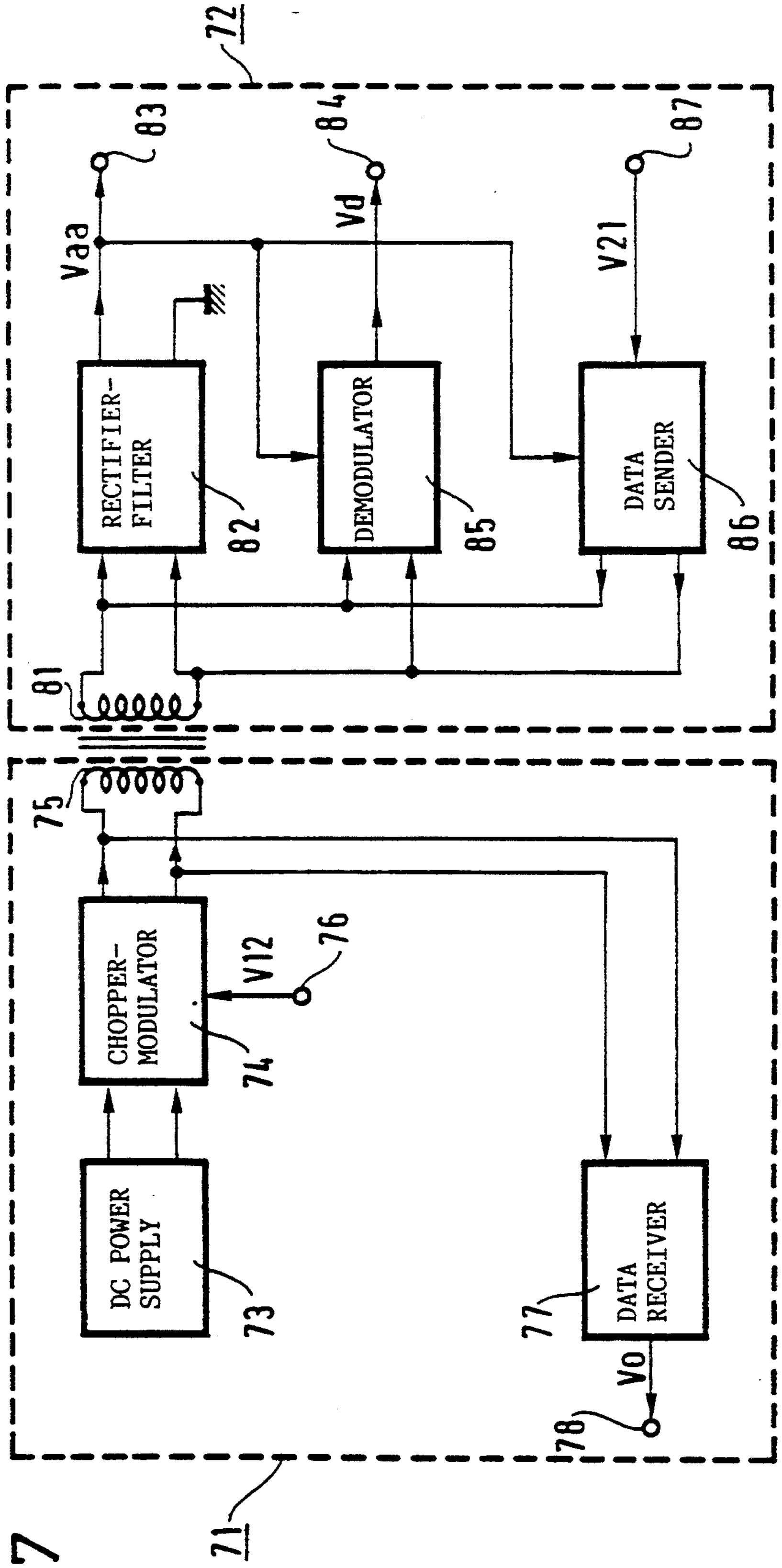
FIG. 7 is a block diagram of electronic means used in the first and second embodiments to transmit electrical power and signals in both directions in half duplex mode.

FIG. 7 is the block diagram of one embodiment of electronic means used in a device in accordance with the invention to transmit power and a data signal from a first part of a machine to a second part. These electronic means may be used in the connection devices of the two franking machines described above with reference to FIGS. 1 and 5. They comprise two subsystems 71 and 72, one in each of the two parts of the machine. They are preferably used for half-duplex transmission because in this case no special precautions are required to separate the data signals in the two directions. They cooperate with a single separable transformer having a first winding 75 on the part 71 and a second winding 81 on the part 72. The use of a single transformer makes the connection device particularly compact.

The part 71 comprises:

—a DC power supply 73 connected to the AC line voltage, for example;

—a chopper-modulator 74 which has an input 76 receiving a data signal V12 to be transmitted to the part 72;

—a data receiver 77 having an output 78 providing a data signal Vo transmitted from the part 72 to the part 71.

The chopper-modulator 74 is inserted between the DC supply 73 and the first winding 75 to chop the DC current and to modulate one characteristic of the chopped current in order to transmit the signal applied to the input 76. The respective ends of the windings 75 are connected to two outputs of the chopper-modulator 74 and to two inputs of the data receiver 77.

Figure 8:
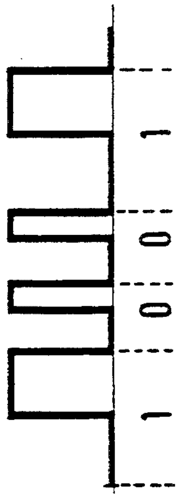
FIG. 8 shows a typical signal transmission timing diagram to illustrate the type of modulation used in this example.

FIG. 8 is a timing diagram showing the current in the winding 75 during transmission of a data signal assuming successively the values 1 0 0 1. The current is made up of pulses which always have a duty cycle of 50% irrespective of the value of the bit transmitted but in which the duration of each bit depends on its value. A bit at 1 has a duration of four microseconds whereas a bit at 0 has a duration of two microseconds, for example. The modulation method employed is thus frequency shift keying but with the duration of a bit changing according to its value. This type of modulation enables a high bit rate and a very simple implementation of the chopper-modulator 74. This may comprise a switching transistor, for example, controlled by a logic circuit supplying a period of a first clock signal if the bit is at 0 or a period of a second clock signal if the bit is at 1. Other types of modulation may naturally be considered, such as position modulation, phase modulation, frequency modulation and amplitude modulation.

The part 72 comprises, in addition to the winding 81:

—a rectifier-filter 82 having an output connected to a reference potential and an output supplying a filtered DC supply voltage Vaa to all the electronic circuits of the part 72 and to an output terminal 83;

—a demodulator 85 for reconstituting at an output terminal 84 the data signal Vd transmitted from the part 71 to the part 72;

—a data sender 86 which has an input 87 receiving a data signal V21 to be transmitted from the part 72 to the part 71, this signal being supplied to it alternately with the data signal Vd at the output terminal 84.

The winding 81 has two ends respectively connected to first and second inputs of the rectifier-filter 82 and the demodulator 85 and to first and second outputs of the data sender 86. The demodulator 85 extracts the data signal Vd modulating the voltage induced in the winding 81 and measures the time between successive rising and falling edges. Depending on whether this time is one microsecond or two microseconds, the demodulator supplies at the output terminal 84 a signal at logic 0 or logic 1.

In order to transmit power the input 75 must receive the data signal. This data may comprise meaningless filler patterns if necessary. For the part 72 to be able to send in its turn it is necessary to interrupt periodically the transmission of power and data by the part 71. The rectifier-filter 82 must therefore be able to continue to supply power to the part 72 during time periods in which the part 71 no longer supplies power to it.

The series of bits transmitted in each direction constitute coded frames constituting messages. The content of these messages is used to manage the half-duplex transmission which is of the synchronous type.

The data sender 86 may comprise a chopper-modulator similar to the chopper-modulator 74 so that the modulation employed is identical to that employed by the latter. In this case the data receiver 77 is analogous to the demodulator 85.

Full duplex transmission of digital signals is possible provided that a type of modulation is used in the sender 86 which provides a signal that can be discriminated from the signal sent by the modulator-chopper 74. Frequency shift keying may be used in each direction with four clearly differentiated frequencies to enable filtering of the frequencies in the data receiver 77 and in the demodulator 85.

Figure 9:
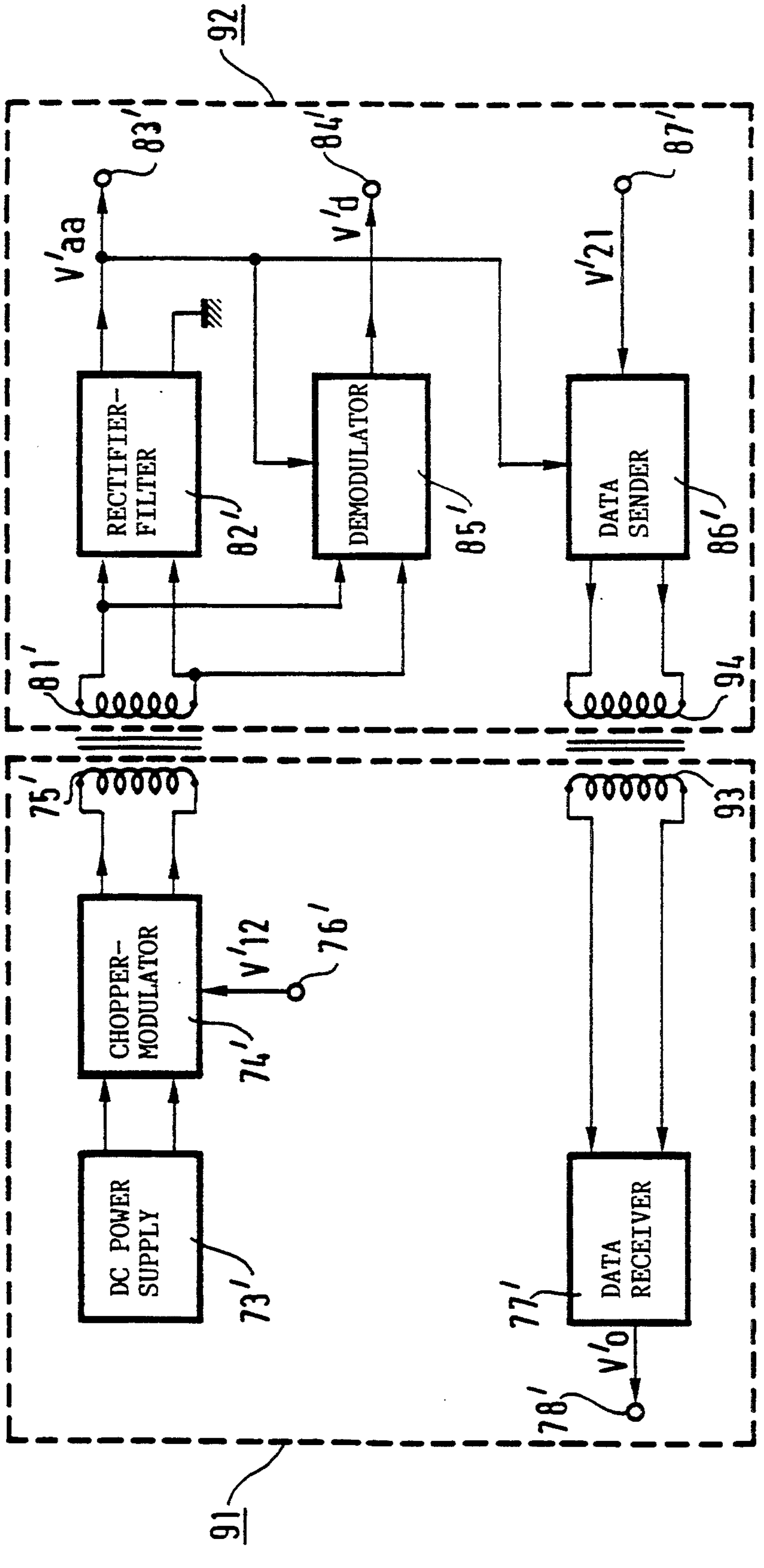
FIG. 9 is a block diagram of an alternative embodiment of the electronic means used in a third embodiment comprising two transformers and which is particularly suitable for full duplex transmission.

FIG. 9 shows an alternative implementation of the electronic means shown in FIG. 7. This variant is more particularly suited to full duplex transmission of digital signals. It has two parts 91, 92 respectively associated with first and second machine parts to be interconnected. Elements analogous to those described previously with reference to FIG. 7 are identified by the same reference number primed. This variant differs from the first one in that there are two transformers. A first transformer has a first winding 75' in the part 91 and a second winding 81' in the part 92. A second transformer has a first winding 93 in the part 91 and a second winding 94 in the part 92. A supply 73' produces a DC voltage which is chopped by a chopper-modulator 74' in sympathy with a data signal V12' applied to an input terminal 76'. The part 91 comprises a data receiver 77' having two inputs respectively connected to the two ends of the winding 93. The receiver 77' is therefore entirely independent of the first transformer 75', 81'. The second transformer 93, 94 is used only to transmit data signals from the part 92 to the part 91. The part 92 comprises:

—a rectifier-filter 82' which has two inputs connected to respective ends of the winding 81', an output connected to a reference potential of the part 92 and an output supplying a supply voltage Vaa' to the electronic circuits of the part 92 and to an output terminal 83';

—a demodulator 85' which has two outputs connected to respective ends of the winding 81' and an output connected to an output terminal 84' to reconstitute a data signal Vd' transmitted from the part 91 to the part 92';

—a data sender 86' which has two inputs connected to respective ends of the winding 94 of the second transformer and an input connected to an input terminal 87' receiving a data signal V21' to be transmitted from the part 92 to the part 91.

The output of the data sender 86' is completely independent of the first transformer 75', 81'. Consequently the same type of modulation may be used in the data sender 86 and in the chopper-modulator 74' because there is no risk of interference between the two transmission directions. Also, the data sender 86' can send continuously without this causing any particular problems. On the contrary, this is advantageous in that it then supplies power continuously. Commercially available integrated circuits providing modulation and demodulation functions for modems can be used for the data senders 86, 86', the chopper-modulators 74, 74' and the demodulators 85, 85'. These circuits may be the PHILIPS devices NE5050, NE5080 and NE5081 which are capable of operating at 500 kHz, for example.

Figure 10:
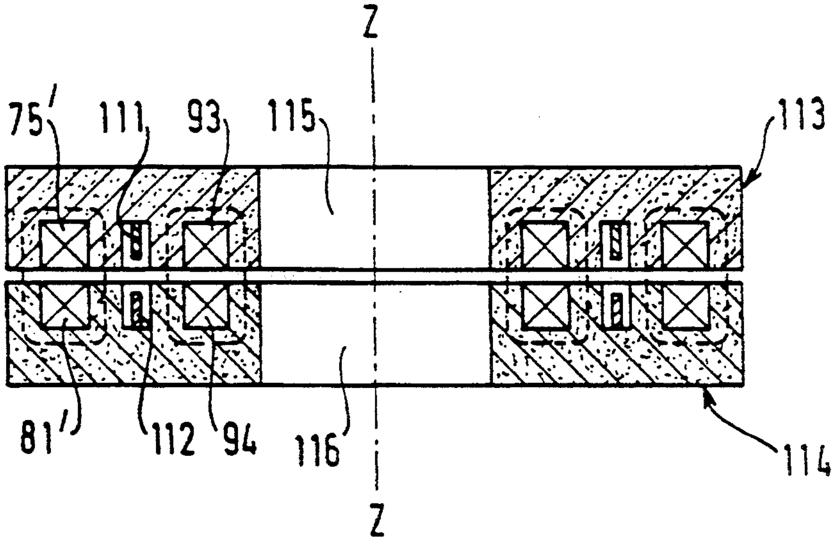
FIG. 10 is a diagrammatic view in cross-section of a device combining two rotary transformers usable in the embodiment shown in FIG. 9.

FIG. 10 is a diagrammatic view in cross-section of a device combining the two transformers 75', 81' and 93, 94. It has two identical halves 103 and 104 each of which essentially comprises a flat cylindrical ferrite member into which are recessed three concentric grooves each of which has an axis of symmetry of revolution coincident with that of the flat cylinder. The magnetic field lines specific to each of the transformers are shown in dashed line.

Figure 11:
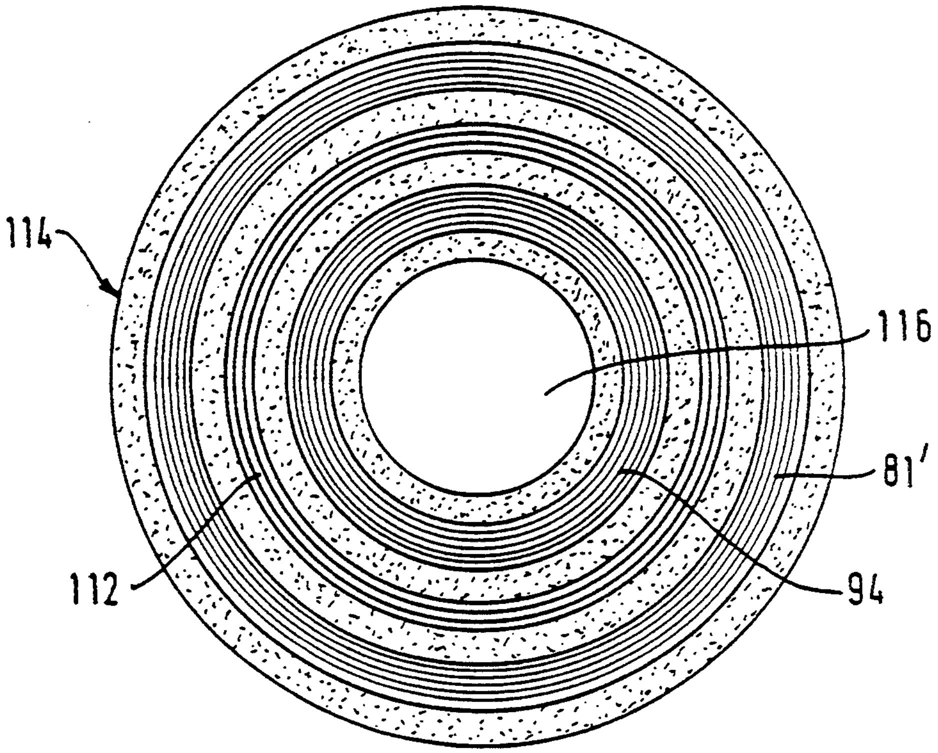
FIG. 11 is a front view of part of this device combining two rotary transformers.

FIG. 11 is a front view of one half 104 of this device. A first groove near the periphery contains the winding 81' (75'). A second groove contains an electrostatic screen 112 (111). The effect of the second groove is to increase the separation between the field lines specific to each of the transformers. The electrostatic screens 111 and 112 are respectively connected to a reference potential of the part 91 and to a reference potential of the part 92 (these connections are not shown). They reduce capacitative interaction between the two transformers. A third groove nearer the axis of symmetry of revolution of the transformer contains the winding 94 (93). A cylindrical central hole 106 (105) may be used to fix the device or to assemble the device. The various windings are connected by wires (not shown) passing through holes (not shown) in the ferrite parts.

The scope of the invention is not limited to the embodiments described hereinabove. In particular it is possible to increase the number of transformers combined in a single pair of ferrite parts to increase the number of independent data transmission channels of the combined data transmission/power transfer connection.

There is claimed:

1. Connection device with no electrical contact for making and breaking at will a connection for transmitting electrical power and an electrical signal from a first part of a machine to a second part of the machine, said device comprising a first transformer separable into two parts, a first part of said transformer being fastened to said first part of said machine and comprising a first magnetic circuit portion passing through a first winding to which the power and the electrical signal to be transmitted are applied, a second part of said transformer comprising a second magnetic circuit portion fastened to said second part of said machine and passing through at least one second electrical winding, said device further comprising:

—means for chopping a current supplied to a first winding of said first transformer by a DC power supply, —means for modulating one characteristic of the current supplied to said first winding in sympathy with a signal to be transmitted from said first part to said second part of said machine, —means for rectifying and filtering a voltage induced in a second winding of said first transformer, the rectified and filtered voltage constituting a supply voltage, and —means for demodulating the voltage induced in said second winding and feeding a signal to said second part of said machine.

2. Device according to claim 1 for additionally transmitting a signal from said second part of said machine to said first part, said device further comprising:

—means for applying to said second winding a voltage modulated in sympathy with said signal to be transmitted from said second part of said machine to said first part, and —means for demodulating a voltage induced in said first winding by said second winding and feeding a signal to said first part of said machine.

3. Device according to claim 1 for additionally transmitting a signal from said second part of said machine to said first part, said device further comprising:

—a second transformer comprising a third winding and a fourth winding for transmitting said signal from said second part of said machine to said first part independently of said power and said signal transmitted by said first and second windings from said first part of said machine to said second part, —means for applying to said fourth winding a voltage modulated in sympathy with said signal to be transmitted from said second part of said machine to said first part, and —means for demodulating a voltage induced in said third winding and feeding a signal to said first part of said machine.

4. Device according to claim 1 wherein said first separable transformer comprises:

—means for guiding said first and second portions of said magnetic circuit into face-to-face relationship upon relative movement towards each other to make a connection, and —holding means for holding said first and second magnetic circuit portions in face-to-face relationship with an airgap of predetermined width between them, said holding means being adapted to be assembled to make a connection and disassembled to break said connection.

5. Device according to claim 4 wherein:

—said transformer has a single axis of symmetry of revolution and is separable on a plane perpendicular to said axis, —said guiding means guide movement in translation along said axis and allow rotation of said first and second parts of said transformer about said axis, and —said holding means for holding said magnetic circuit portions in face-to-face relationship apply opposite forces parallel to said axis respectively to said first and second parts of said transformer to urge them towards each other.

6. Device according to claim 5 wherein said guiding means comprise:

—a first member fastened to one of said two parts of said machine and incorporating a cavity whose inside surface is frustoconical and which has an axis of symmetry of revolution coincident with the axis of symmetry of said transformer, said frustoconical surface being truncated by a plane surface orthogonal to said axis of symmetry and a peripheral ring of said plane surface constituting a first abutment surface, and —a second member fastened to the other of said two parts of said machine and having a projecting part whose outside surface is frustoconical and has an axis of symmetry of revolution coincident with the axis of symmetry of said transformer, said frustoconical surface being truncated by a plane surface orthogonal to said axis of symmetry and a peripheral ring of said plane surface constituting a second abutment surface, in which device said two frustoconical surfaces have the same cone angle whereby they are adapted to fit one within the other and said two abutment surfaces are adapted to bear against each other when said frustoconical surfaces are fitted together.

7. Device according to claim 5 wherein said guiding means comprise:

—a first member fastened to one of said two parts of said machine and incorporating a cavity whose inside surface is a circular cylinder and has an axis of symmetry of revolution coincident with the axis of symmetry of said transformer, the back of said cavity being a plane surface orthogonal to said axis of rotation and a peripheral ring of said back constituting a first abutment surface, and —a second member fastened to the other of said two parts of said machine and having a projecting part whose outside surface is a circular cylinder and which has an axis of symmetry of revolution coincident with the axis of symmetry of said transformer, said projecting part ending at a plane surface orthogonal to said axis of symmetry and a peripheral ring of said plane surface constituting a second abutment surface, in which device said two cylindrical surfaces have very similar diameters in order to enable them to be nested one within the other and to rotate relative to each other.

8. Device according to claim 2 wherein said transformer comprises a magnetic circuit comprising two ferrite parts each in the form of a flat cylinder into which is recessed a groove concentric with said cylinder adapted to receive one of said two windings.

9. Device according to claim 3 comprising:

—a first ferrite part common to said first and second transformers to constitute first portions of their respective magnetic circuits, and —a second ferrite part common to said first and second transformers to constitute second portions of their respective magnetic circuits, in which device said two ferrite parts are each in the form of a flat cylinder into which are recessed two concentric grooves respectively adapted to contain two windings and a concentric groove between said two grooves adapted to contain an electrostatic screen to isolate the magnetic circuits of said first and second transformers.

10. Mail franking machine comprising a printhead removable from a fixed base and, for connecting electronic circuitry of said head to electronic circuitry of said base, a connection device with no electrical contact for making and breaking at will a connection for transmitting electrical power and an electrical signal from a first part of a machine to a second part of the machine, said device comprising a first transformer separable into two parts, a first part of said transformer being fastened to said first part of said machine and comprising a first magnetic circuit portion passing through a first winding to which the power and the electrical signal to be transmitted are applied, a second part of said transformer comprising a second magnetic circuit portion fastened to said second part of said machine and passing through at least one second electrical winging, said device further comprising:

—means for chopping a current supplied to a first winding of a first transformer by a DC power supply, —means for modulating one characteristic of the current supplied to said first winding in sympathy with a signal to be transmitted from said first part to said second part of said machine, —means for rectifying and filtering a voltage induced in a second winding of said first transformer, the rectified and filtered voltage constituting a supply voltage, and —means for demodulating the voltage induced in said second winding and feeding a signal to said second part of said machine.

11. Machine according to claim 10 for additionally transmitting a signal from said second part of said machine to said first part, said device further comprising:

—means for applying to said second winding a voltage modulated in sympathy with said signal to be transmitted from said second part of said machine to said first part, and —means for demodulating a voltage induced in said first winding by said second winding and feeding a signal to said first part of said machine.

12. Machine according to claim 10 for additionally transmitting a signal from said second part of said machine to said first part, said device further comprising:

—a second transformer comprising a third winding and a fourth winding for transmitting said signal from said second part of said machine to said first part independently of said power and said signal transmitted by said first and second windings from said first part of said machine to said second part, —means for applying to said fourth winding a voltage modulated in sympathy with said signal to be transmitted from said second part of said machine to said first part, and —means for demodulating a voltage induced in said third winding and feeding a signal to said first part of said machine.

13. Machine according to claim 10 wherein said first separable transformer comprises:

—means for guiding said first and second portions of said magnetic circuit into face-to-face relationship upon relative movement towards each other to make a connection, and —holding means for holding said first and second magnetic circuit portions in face-to-face relationship with an airgap of predetermined width between them, said holding means being adapted to be assembled to make a connection and disassembled to break said connection.

14. Machine according to claim 13 wherein:

—said transformer has a single axis of symmetry of revolution and is separable on a plane perpendicular to said axis, —said guiding means guide movement in translation along said axis and allow rotation of said first and second parts of said transformer about said axis, and —said holding means for holding said magnetic circuit portions in face-to-face relationship apply opposite forces parallel to said axis respectively to said first and second parts of said transformer to urge them towards each other.

15. Machine according to claim 14 wherein said guiding means comprise:

—a first member fastened to one of said two parts of said machine and incorporating a cavity whose inside surface is frustoconical and which has an axis of symmetry of revolution coincident with the axis of symmetry of said transformer, said frustoconical surface being truncated by a plane surface orthogonal to said axis of symmetry and a peripheral ring of said plane surface constituting a first abutment surface, and —a second member fastened to the other of said two parts of said machine and having a projecting part whose outside surface is frustoconical and has an axis of symmetry of revolution coincident with the axis of symmetry of said transformer, said frustoconical surface being truncated by a plane surface orthogonal to said axis of symmetry and a peripheral ring of said plane surface constituting a second abutment surface, in which device said two frustoconical surfaces have the same cone angle whereby they are adapted to fit one within the other and said two abutment surfaces are adapted to bear against each other when said frustoconical surfaces are fitted together.

16. Machine according to claim 11 wherein said transformer comprises a magnetic circuit comprising two ferrite parts each in the form of a flat cylinder into which is recessed a groove concentric with said cylinder adapted to receive one of said two windings.

17. Machine according to claim 12 comprising:

—a first ferrite part common to said first and second transformers to constitute first portions of their respective magnetic circuits, and —a second ferrite part common to said first and second transformers to constitute second portions of their respective magnetic circuits, in which device said two ferrite parts are each in the form of a flat cylinder into which are recessed two concentric grooves respectively adapted to contain two windings and a concentric groove between said two grooves adapted to contain an electrostatic screen to isolate the magnetic circuits of said first and second transformers.

18. Mail franking machine comprising a printhead having a rotary print drum containing rotary electronic circuits and, for connecting said electronic circuits in said drum to fixed electronic circuits in said printhead, a connection device with no electrical contact for making and breaking at will a connection for transmitting electrical power and an electrical signal from a first part of a machine to a second part of the machine, said device comprising a first transformer separable into two parts, a first part of said transformer being fastened to said first part of said machine and comprising a first magnetic circuit portion passing through a first winding to which the power and the electrical signal to be transmitted are applied, a second part of said transformer comprising a second magnetic circuit portion fastened to said second part of said machine and passing through at least one second electrical winding, said device further comprising:

—means for chopping a current supplied to a first winding of said first transformer by a DC power supply, —means for modulating one characteristic of the current supplied to said first winding in sympathy with a signal to be transmitted from said first part to said second part of said machine, —means for rectifying and filtering a voltage induced in a second winding of said first transformer, the rectified and filtered voltage constituting a supply voltage, and —means for demodulating the voltage induced in said second winding and feeding a signal to said second part of said machine.

19. Machine according to claim 18 for additionally transmitting a signal from said second part of said machine to said first part, said device further comprising:

—means for applying to said second winding a voltage modulated in sympathy with said signal to be transmitted from said second part of said machine to said first part, and —means for demodulating a voltage induced in said first winding by said second winding and feeding a signal to said first part of said machine.

20. Machine according to claim 18 for additionally transmitting a signal from said second part of said machine to said first part, said device further comprising:

—a second transformer comprising a third winding and a fourth winding for transmitting said signal from said second part of said machine to said first part independently of said power and said signal transmitted by said first and second windings from said first part of said machine to said second part, —means for applying to said fourth winding a voltage modulated in sympathy with said signal to be transmitted from said second part of said machine to said first part, and —means for demodulating a voltage induced in said third winding and feeding a signal to said first part of said machine.

21. Machine according to claim 18 wherein said first separable transformer comprises:

—means for guiding said first and second portions of said magnetic circuit into face-to-face relationship upon relative movement towards each other to make a connection, and —holding means for holding said first and second magnetic circuit portions in face-to-face relationship with an airgap of predetermined width between them, said holding means being adapted to be assembled to make a connection and disassembled to break said connection.

22. Machine according to claim 21 wherein:

—said transformer has a single axis of symmetry of revolution and is separable on a plane perpendicular to said axis, —said guiding means guide movement in translation along said axis and allow rotation of said first and second parts of said transformer about said axis, and —said holding means for holding said magnetic circuit portions in face-to-face relationship apply opposite forces parallel to said axis respectively to said first and second parts of said transformer to urge them towards each other.

23. Machine according to claim 22 wherein said guiding means comprise:

—a first member fastened to one of said two parts of said machine and incorporating a cavity whose inside surface is a circular cylinder and has an axis of symmetry of revolution coincident with the axis of symmetry of said transformer, the back of said cavity being a plane surface orthogonal to said axis of rotation and a peripheral ring of said back constituting a first abutment surface, and —a second member fastened to the other of said two parts of said machine and having a projecting part whose outside surface is a circular cylinder and which has an axis of symmetry of revolution coincident with the axis of symmetry of said transformer, said projecting part ending at a plane surface orthogonal to said axis of symmetry and a peripheral ring of said plane surface constituting a second abutment surface, in which device said two cylindrical surfaces have very similar diameters in order to enable them to be nested one within the other and to rotate relative to each other.

24. Machine according to claim 19 wherein said transformer comprises a magnetic circuit comprising two ferrite parts each in the form of a flat cylinder into which is recessed a groove concentric with said cylinder adapted to receive one of said two windings.

25. Machine according to claim 20 comprising:

—a first ferrite part common to said first and second transformers to constitute first portions of their respective magnetic circuits, and —a second ferrite part common to said first and second transformers to constitute second portions of their respective magnetic circuits, in which device said two ferrite parts are each in the form of a flat cylinder into which are recessed two concentric grooves respectively adapted to contain two windings and a concentric groove between said two grooves adapted to contain a electrostatic screen to isolate the magnetic circuits of said first and second transformers.

* * * * *